(12) United States Patent
Hofman (10) Patent No.: US 9,727,431 B2
(45) Date of Patent: Aug. 8, 2017

(54) COMMUNICATION MONITORING SYSTEM

(71) Applicant: Sital Ltd., Kfar-Saba (IL)

(72) Inventor: Ofer Hofman, Timrat (IL)

(73) Assignee: Sital Ltd., Kfar-Saba (IL)

( * ) Notice: Subject to any disclaimer, the term of this patent is extended or adjusted under 35 U.S.C. 154(b) by 84 days.

(21) Appl. No.: 14/559,966

(22) Filed: Dec. 4, 2014

(65) Prior Publication Data

US 2015/0186234 A1 Jul. 2, 2015

Related U.S. Application Data

(60) Provisional application No. 61/921,541, filed on Dec. 30, 2013, provisional application No. 61/981,209, filed on Apr. 18, 2014.

(51) Int. Cl.
G06F 11/277 (2006.01)
G06F 11/22 (2006.01)

(52) U.S. Cl.
CPC .................. *G06F 11/221* (2013.01)

(58) Field of Classification Search
USPC .......................................................... 714/43
See application file for complete search history.

(56) References Cited

U.S. PATENT DOCUMENTS

| | | | |
|---|---|---|---|
| 7,812,617 B2 | 10/2010 | Hofman | |
| 9,110,951 B2 * | 8/2015 | Jiang | G06F 11/3048 |
| 9,215,045 B2 * | 12/2015 | Kim | H04L 1/24 |
| 2003/0067642 A1 * | 4/2003 | Svenson | H03K 5/12 |
| | | | 398/36 |
| 2005/0102247 A1 * | 5/2005 | Wells | G06N 3/063 |
| | | | 706/26 |
| 2005/0235360 A1 * | 10/2005 | Pearson | H04L 29/06 |
| | | | 726/23 |
| 2005/0251598 A1 * | 11/2005 | Osaka | G06F 13/4086 |
| | | | 710/100 |
| 2008/0043629 A1 * | 2/2008 | Hofman | H04L 12/2697 |
| | | | 370/242 |
| 2008/0186870 A1 * | 8/2008 | Butts | H04L 41/0659 |
| | | | 370/252 |
| 2013/0325149 A1 * | 12/2013 | Manssen | H04B 1/0458 |
| | | | 700/37 |
| 2015/0270870 A1 * | 9/2015 | Hofman | H04B 3/02 |
| | | | 375/219 |
| 2015/0304190 A1 * | 10/2015 | Hofman | H04L 43/0811 |
| | | | 375/224 |

* cited by examiner

*Primary Examiner* — Kamini Patel
(74) *Attorney, Agent, or Firm* — Manelli Selter PLLC; Edward J. Stemberger (57) ABSTRACT

A system for monitoring of integrity of a communication bus includes a communication bus cooperating with at least one transmitter configured to generate and transmit a signal on communication bus. At least one receiver is configured to receive a signal generated by the transmitter and transmitted on communication bus. The receiver is further configured to receive the transmitted signal as well as any reflected signals arising from non-impedance matched section in communication bus and wherein a time difference between transmitted pulse width and received pulse width indicates a distance between the non-impedance matched section and the transmitter on the communication bus.

5 Claims, 10 Drawing Sheets

COMMUNICATION MONITORING SYSTEM

The present application claims priority from U.S. Provisional Application No. 61/921,541 filed Dec. 30, 2013 and Provisional Patent Application No. 61/981,209 filed on Apr. 18, 2014. Both applications are incorporated here by reference.

TECHNOLOGY FIELD

The present device and method relate to the field of communication bus status diagnostics and in particular to real time detection of faults in communication buses.

BACKGROUND

Figure 1:
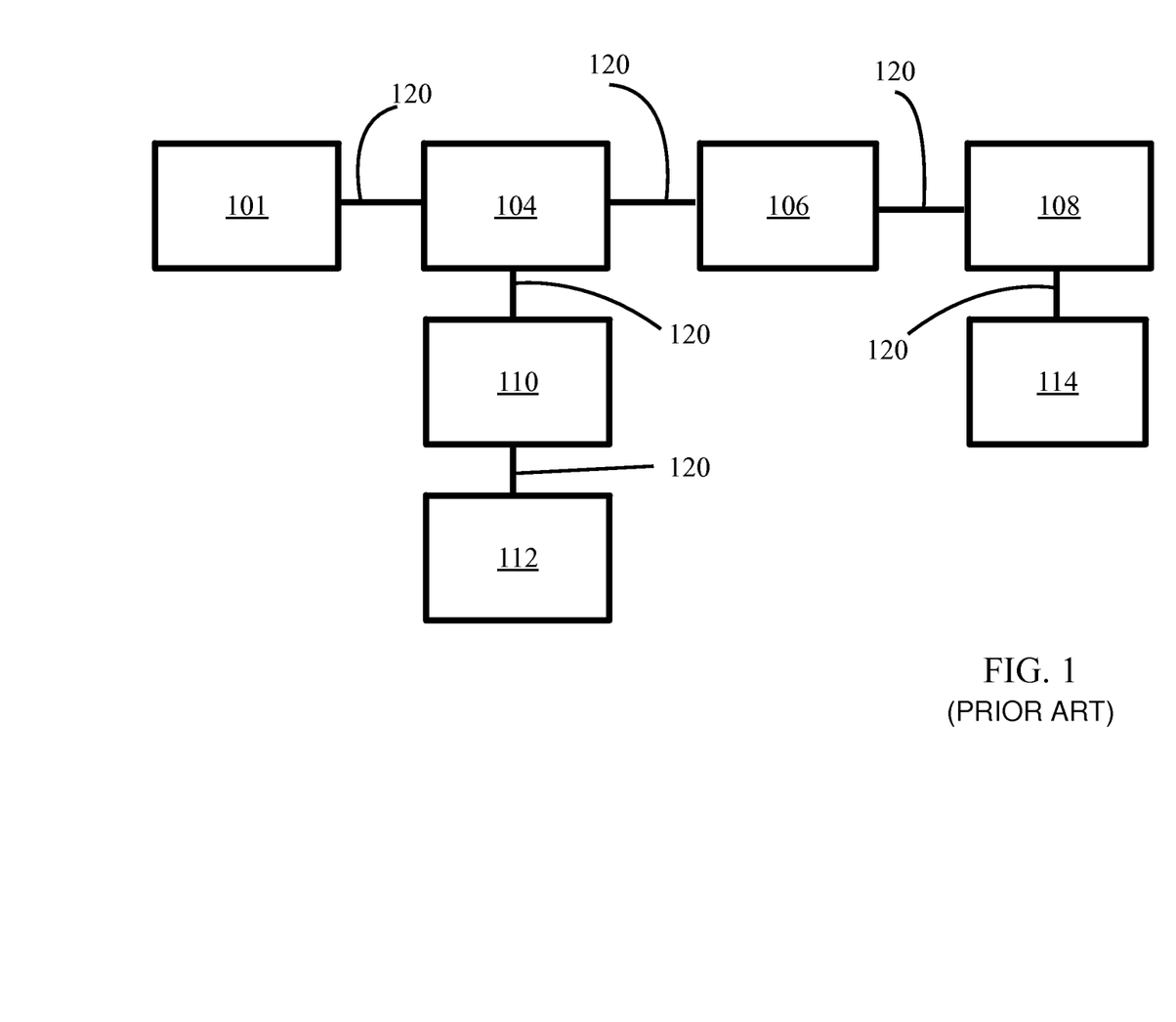
FIG. 1 is an example of existing communication bus architecture for connecting multiple devices.

There are several architectures for transmitting information from one electronic device to another. A commonly used architecture is shown in FIG. 1. In this architecture the devices share a common communication structure, often called a data bus or communication bus. In this architecture, each device connected to the bus can transmit information on the bus, or receive any information transmitted on the bus. In addition the information transmitted on the bus can pass undistorted through each of the devices. The section of the communication bus connecting one device to another may be termed communication bus line or link. The physical medium through which the signal is transported can be an electrical wire or optical fiber. The signal transmitted from one device to another device on the communication bus can be a change in the voltage, an optical pulse, an electrical pulse with an underlying RF (radio frequency) modulation or similar implementations. Examples of such buses are Mil-Std-1553, CAN, FlexRay and others. Since the transmitted signal passes through multiple devices, it is clear that the connection to each device should not cause any changes in the signal. In a one dimensional communication bus, every device has at most two bus links connecting it to other devices. In a two dimensional or multi-dimensional communication bus there is at least one device with three or more bus links connecting it to other devices. In particular, the devices, and the communication bus links should be impedance matched to prevent reflections of the signal. Conversely, any situation in which there is a fault in the communication bus link, the fault and bus link would not be impedance matched and the result would be a reflected signal.

The communication buses described above can host a large amount of devices. A potential problem in these buses is that a fault in the bus would prevent the passage of information from devices before and after the fault. Current techniques to identify faults or failures in the bus are too costly to support use in low cost applications which some industries such as in-car communications require. U.S. Pat. No. 7,812,617 to the same assignee, describes a method to identify the fault in a communication bus. The method is based on identifying reflections in the communication bus. The reflections are caused by the fault in one of the bus links and are referred to as 'signal tail'. U.S. Pat. No. 7,812,617 suggest a method of identifying the location of the fault by measuring the timing of such multiple tails, and using triangulation to identify the location of a fault.

Glossary

"Communication bus"—as used in the current disclosure communication bus means a structure connecting between different devices or modules configured to receive and transmit signals from one or more sources of the signal to one or more devices or modules hosted by the bus.

"Bus link or line"—as used in the current disclosure means a continuous electric or optical line extending through two or more devices or modules on the bus.

"Data bus"—as used in the current disclosure communication bus means a structure connecting between different devices or modules configured to receive and transmit data from one or more sources of the signal to one or more devices or modules hosted by the bus.

"Impedance matched"—as used in the current disclosure means the characteristic impedance of the bus link is matched to the characteristic impedance of the device connected to the link. Also it means the impedance of the line is constant.

"Fault in the bus"—as used in the current disclosure means a portion of a bus line or device hosted on the bus, which is not impedance matched and causes a reflection in of the transmitted signal.

"Integrity of the bus"—as used in the current disclosure means that no faults are identified in the line.

"Physical medium"—as used in the current disclosure means the material, composition and form (e.g. copper wire, optical fiber, etc.) of the communication bus link.

"Signal tail"—as used in the current disclosure means the temporal function of the last part of the signal.

"Signal width"—as used in the current disclosure means the elapsed time from a threshold level crossing of the rising part of the signal, to a threshold level crossing of the falling part of the signal.

"Signal rise time"—as used in the current disclosure is the time required for the signal to rise to its ON state.

"Signal fall time"—as used in the current disclosure is the time required for the signal to return to OFF state.

"Pulse start"—as used in the current disclosure is the section of pulse after crossing the threshold of the rising signal.

"Pulse end"—as used in the current disclosure is the section of the pulse before crossing the threshold of the falling signal.

DESCRIPTION

A typical known communication bus is shown in FIG. 1. This bus includes a number of devices 101, 104, 106, 108,

110, 112, and 114, which are connected to the communication bus, 120. The communication between the devices is achieved by the communication bus, 120. In the course of normal communication bus 120 operation, signals are transmitted along the bus, and through each of the devices, without changes or distortion or with potentially small changes in the signal which meets the defined bounds of the communication bus 120. In particular the reflection of signals transmitted (along the bus) along the communication link are minimized.

Figure 2:
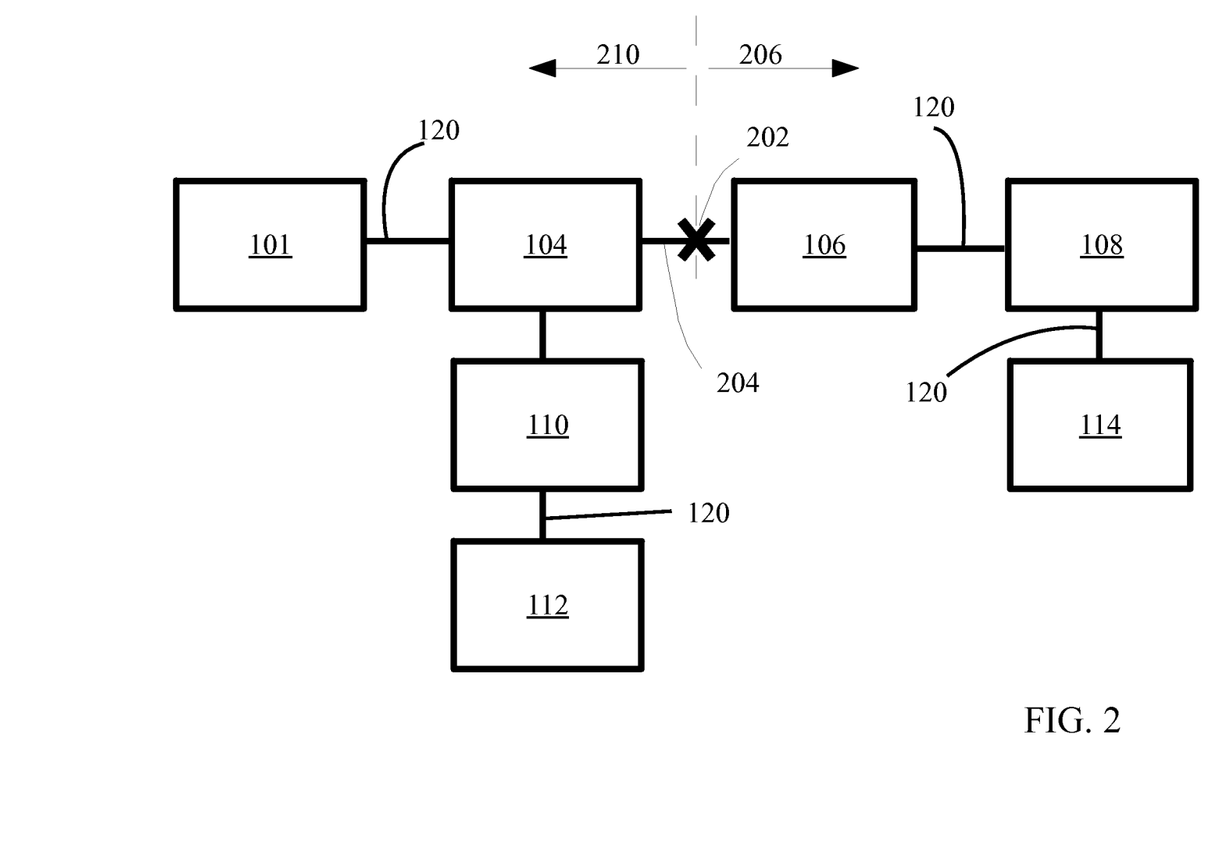
FIG. 2 is an example of a fault in a communication bus.

FIG. 2 is an example of a fault in a communication bus. The fault 202 violates the integrity of the communication bus 120. The fault, 202 could be any of the following:

A cut or open section in the communication link;
In case of a two wire link, a short circuit between the two wires;
A short circuit between one or more of the wires to the ground;
An intermittently open (disconnected) connector;
Corrosion causing increased resistance; or
Other similar such occurrences.

The communication buses described above can host a large amount of devices. A potential problem in these buses is that a fault in the communication bus would prevent the passage of information from devices before the fault and after the fault. U.S. Pat. No. 7,812,617 to the same assignee, describes a method to identify the communication link with a fault in a two dimensional network. The method is based on identifying reflections in the communication bus. The reflections are caused by the fault in the line and referred to as 'signal tail'. U.S. Pat. No. 7,812,617 suggest a method of identifying the location of the fault by measuring the timing of such multiple tails, and using triangulation to identify the location of a fault.

The above described method requires knowledge of the timing of the signals in the communication bus. While this is feasible for some of the communication links, the time delay caused by each device is unknown. Hence in a typical communication bus, the time delay of the signals from one location to another is unknown. This distorts the triangulation results and renders them unreliable. Hence it is desired to have a method, which does not require knowledge of the time delay of each device connected to the communication bus.

The current method supports accurate diagnostic of a bus fault condition and identifying the fault location by comparing the time duration of the transmitted pulse to the received pulse. The pulse time duration can be measured using a simple and low cost timer-counter which is triggered to start to count at one threshold crossing and triggered to stop the count at a second threshold crossing. The total counts provides the time duration of a key event in the signal. In this manner, this method provides for analysis of complex analog signals by using identifying their temporal length using a low cost and simple temporal counter.

In all communication bus fault cases the following could occur:

All devices on one side, for example 206 of the fault 202 will stop communicating with devices on the other side 210 of the fault. For example, in FIG. 2, devices located on side 206 of communication bus 120 will stop communicating with devices located on side 210 of communication bus 120.
Signals transmitted towards the fault 202 will be partially reflected since the fault 202 is not impedance matched to the communication bus link 204.

Figure 3:
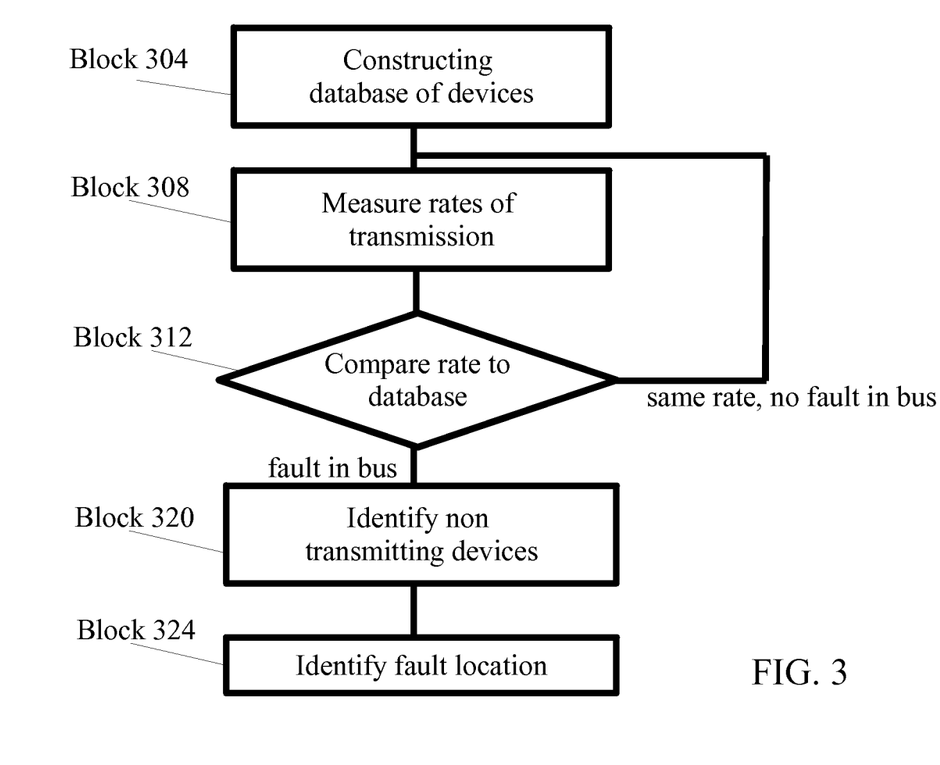
FIG. 3 is a schematic illustration of a fault detection process in a communication bus according to an example.

The present disclosure suggests a method, which can identify the fault location without prior knowledge of the delay caused by each device connected to the communication bus. FIG. 3 is a schematic illustration of a fault detection process in a communication bus according to an example. The processor or method includes construction of a database of some or all devices (Block 304) which are connected to the bus 120 and additional information regarding their relative location, transmission rate and typical transmission codes.

Measurement of the rates of the transmission on the communication bus 120 and comparing the rate of each device transmission to the database (Block 308) could be initiated following the database construction. A fault, such as for example fault 202 or a malfunctioning device could be identified when the rate of transmission becomes different than that of the database (Block 312).

Block 320 identifies the communication link (204) in which there is a fault. The link is identified by finding one transmitting device, for example, (104) and an adjacent non transmitting device (106). Following fault (202) identification, fault location could be determined (Block 320) by finding the distance of the fault (202) from the transmitting device (104), which could be done by comparing width of received signal to width of transmitted signal from the device (104) closest to the fault (202) location.

Fault 202 can also be a partial fault resulting in an open connection in just one of the wires of the communication link. Due to the differential nature of the communication link, such a fault will cause all the signals transmitted from a device and passing through the fault to be shorter than normal. As an example if device 106 transmits a signal composed of a pulse with a width of 6 micro seconds. Device 104 will receive this pulse with a width of 5.5 microseconds. By providing a method to measure pulse width as will be detailed later, the system can identify also faults of a single wire disconnection.

Figure 4A:
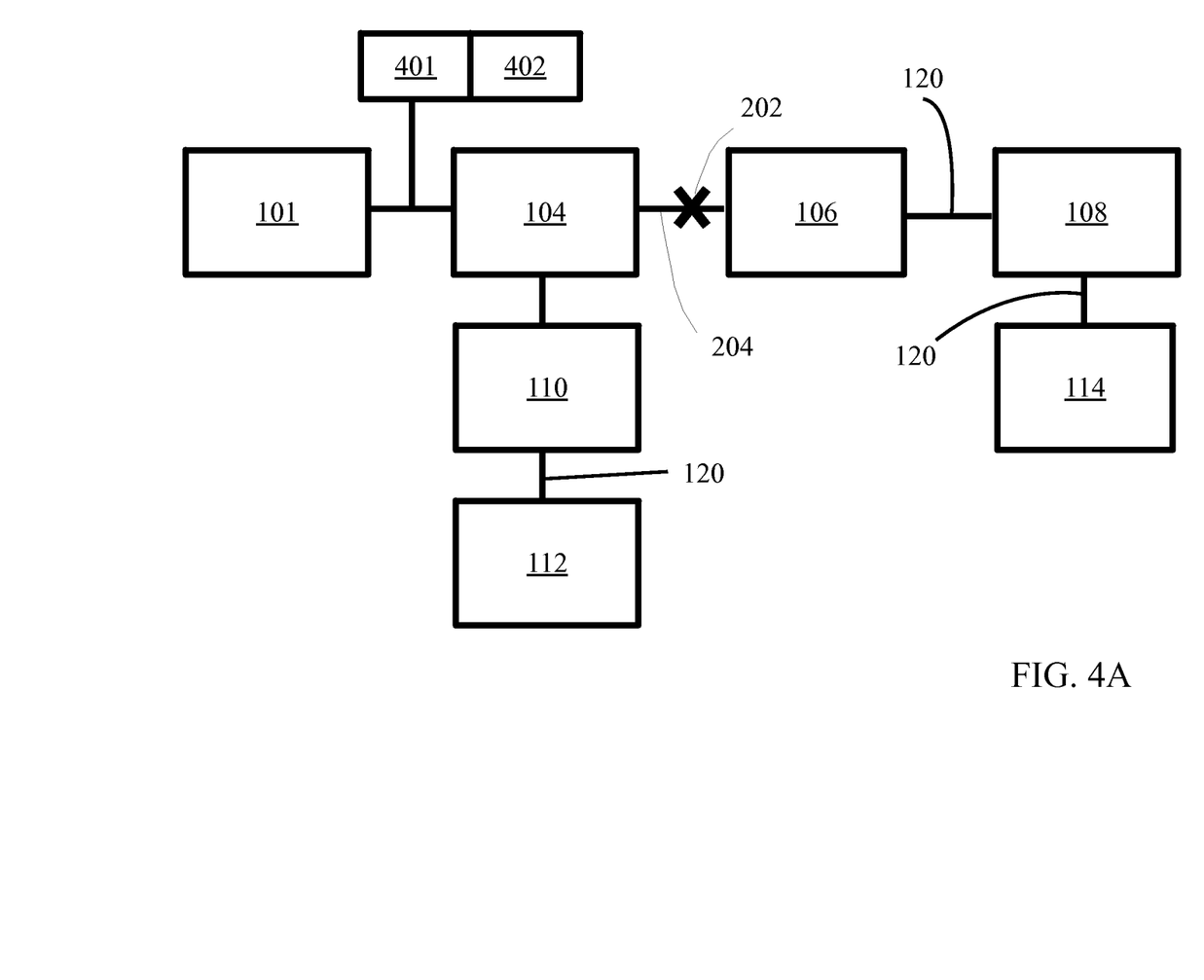
FIG. 4A is an example of system of FIG. 1, with receiver as a stand-alone device on the communication bus.
Figure 4B:
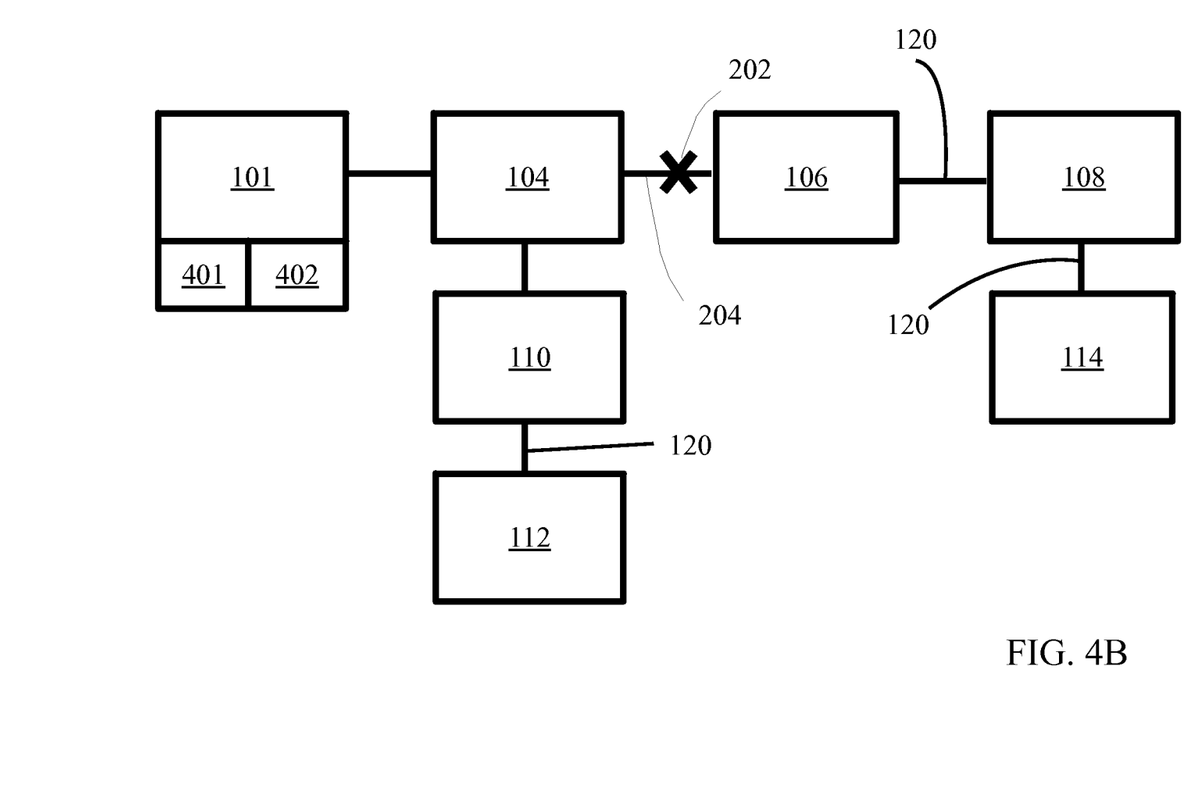
FIG. 4B is an example of system of FIG. 1, with a receiver integrated into a device on the communication bus.

The database could be generated for example a-priori by the communication bus manufacturer. As another example, the device information is appended into the database as each of the devices is connected to the communication bus. In another example, the database can be constructed from the transmitted signals during the operation of the communication bus. The database is used to identify a fault occurrence as well as find the bus section which connects two devices in which the fault is occurring. Fault occurrence is identified when certain devices on the communication bus stop transmitting. For example, in FIG. 4, the database is being constructed by signals received by receiver 401. In the case of a fault, for example such as fault 202, the transmission from devices 106, 108, and 114 will cease to be received by receiver 401.

In the case, for example of a CAN bus usually used in automobiles or cars, the devices could periodically transmit information such as engine speed, oil pressure, temperature, gas pedal status, etc. Each device hosted by the communication has a rate of information transmission, defined by its operation. The data base could include at least the following information:

Device ID,
In some cases, device typical messages,
Rate of data transmittance, i.e. how often does the device transmit,
Device relative location along the link.

The data base could be constructed when the communication bus is assembled. In this case the ID and information of the devices could be entered into the database, either manually or automatically. The structure of the communication bus is fixed in a given product module, i.e. the communication bus of a certain car model is identical in all cars of the same model. In one example, the database can be defined by the manufacturer of the product module for a given product module. In another example, the database can be constructed during the operation of the communication bus. In this case, the device information can be identified by a passive receiver on the bus which records the signals. The relative location of the devices along the communication bus is still defined by the manufacturer of the bus, however the information pertaining to the messages and communication rate, could be obtained by analyzing the data received by the receiver. In still a further example, the database can be constructed by actively interrogating the devices on the bus. A designated transmitter could send a signal which requires the response of all the devices. The frequency of data transmission and information types can be assembled by a passive receiver as described above.

Use of a receiver facilitates block 308 implementation. FIG. 4A is an example, of a system of FIG. 1 with receiver 401 implemented as a standalone device, on the communication bus. FIG. 4B is an example, of a system of FIG. 1 with receiver 401, which is integrated in device 101. Both FIG. 4A and FIG. 4B show receiver (401) connected to the communication bus. Receiver (401) continuously monitors all signals on the communication bus. A processing unit (402) built-in into receiver 401 (FIG. 4B) is configured to process the signals, maintain the database and compare new signals to the database. The processing unit (402) could be further connected to an external system. The external system can be used to record the operation of the receiver, maintain and update the database, provide a communication port for servicing the receiver or removing the recorded data. The connection can be with a wireless connection such as Bluetooth, WiFi, Zigbee, GSM, or other forms of wireless communication. The processing unit can also be connected to a non-volatile memory device such as hard disk, USB disk drive or other Solid State memory device. As a signal is received by receiver 401 it is compared to the database. For example, the database can contain a designation of the last signal received. Periodically, at a period determined by the rate of messages on the bus, and the required rate of alarm, the database is scanned. The standard rate of transmission, as recorded in the database, of each device is compared to the actual transmission rate of the device. As an example, the database can be scanned at the rate of the slowest device messaging. Alternatively in another example, the database can be scanned at the required alarm rate, e.g. 10 ms or other predetermined rate. In one example, alarms can be triggered when one or more devices are late to transmit at their standard transmission rate. For example a fault can occur, when there is either an open termination or short circuit termination, or connection to a local or global ground terminal. The termination or connection can be temporary such as an intermittent connector problem or permanent such as a cut in the link. The open termination or short circuit termination, or connection to a local or global ground terminal will create a non-impedance matched section in the communication bus. Signals arriving towards the non-impedance matched section will be reflected back, and will not cross the termination. As a result the devices on the same side of the termination as the receiver (401) will have expanded signal width compared to the transmitted signal. Signals from devices on the other side of the termination as the receiver (401) will not be received by the receiver since they cannot pass the non-impedance matched section.

The threshold for alarm can be defined for both the number of devices, as well as the number of missed messages or time delay of expected message. Once an alarm is triggered, the system activates block 320. In block 320, all devices which are late to transmit are identified. Using the location information of the devices, the system identifies the transmitting and non-transmitting devices on the communication bus.

Figure 6:
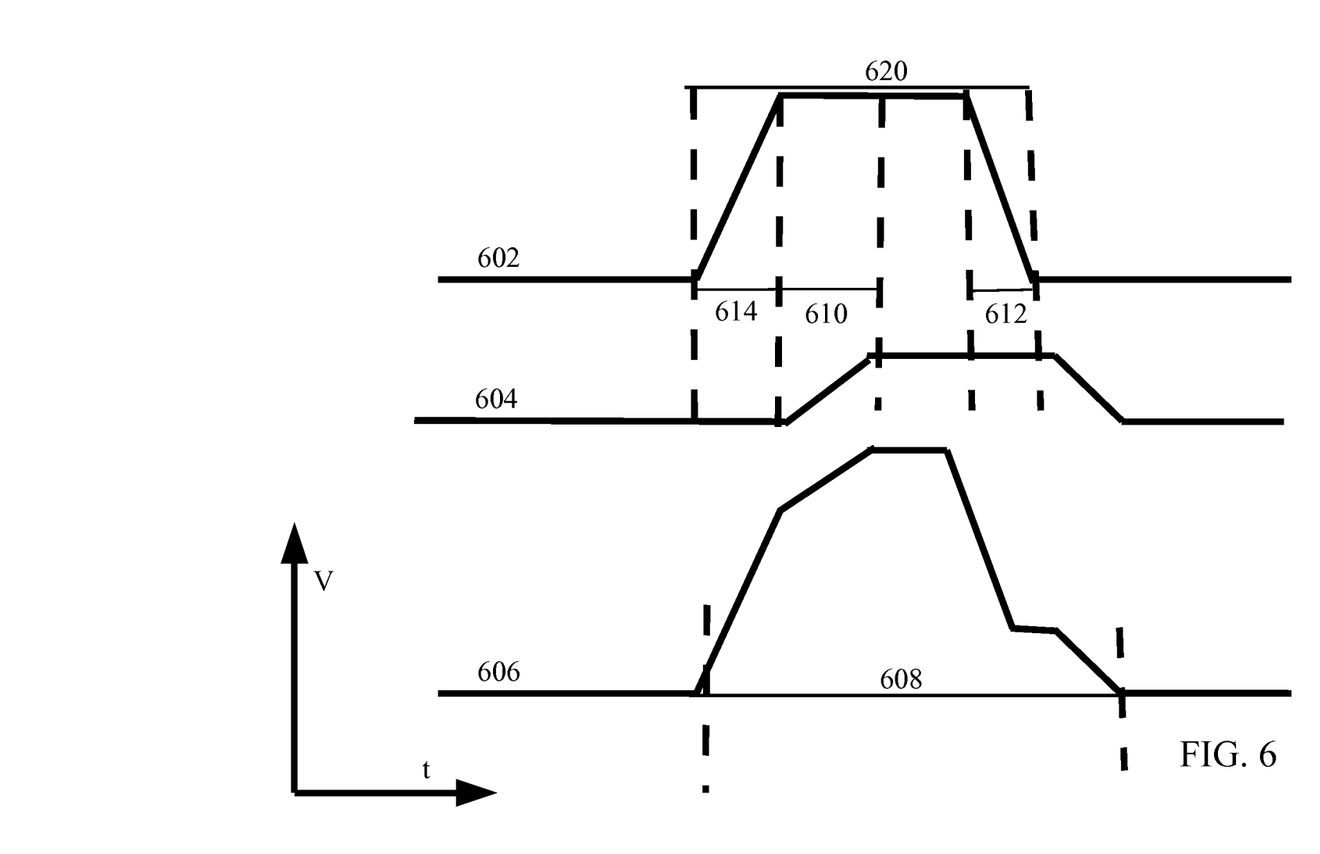
FIG. 6 is an example of assessment of the distance of the fault from the transmitting device based on a received signal which is a combination of transmitted signal and reflected signal from fault.

In another example the receiver (401) and processing system (402) monitors not only the transmission rate of the different devices but also the pulse width of the received signals. In the case of a fault, either an intermittent fault or a constant fault in the line, the pulse width of the received signals will be increased. The reason for the increase in pulse width is shown in FIG. 6. The received pulse is now composed of the transmitted signal (602) with a reflected signal from the fault. The reflected signal is an attenuated, time delayed replica (604) of the transmitted pulse (602). The result is an expanded width of the received pulse. The threshold for an alarm indicating a fault can be a combination of:

devices which are late to transmit or which transmissions have stopped as compared to their transmission rate in the database, devices whose transmission is received, whose pulse width has increased compared to the transmitted pulse, a combination of the above.

In another example, device 401 includes a transmitter. The transmitter periodically interrogates the communication bus by sending a message which requires the reply of all devices on the bus. An example of such a message is a programming signal which is used to check the readiness of the devices before programming them via the bus. Another example of a potential signal a '1' followed by a set number of zeros. In some systems such a signal has the highest priority in the system and would cause all the devices in the system to respond. In these examples, after receiving such a signal, all devices on the bus will respond with a message. The response from all the devices is received and analyzed by the receiver of 401 in a similar manner as described above. If a device does not answer the response, the receiver of 401 and processing system 402 can identify the existence of a fault between the non-answering device and the nearest device to answer. The periodic transmission from 401 can enhance the rate of detection of faults on the bus to a rate defined by the design of 401 and not at a rate defined by the system and devices on the bus.

Figure 5:
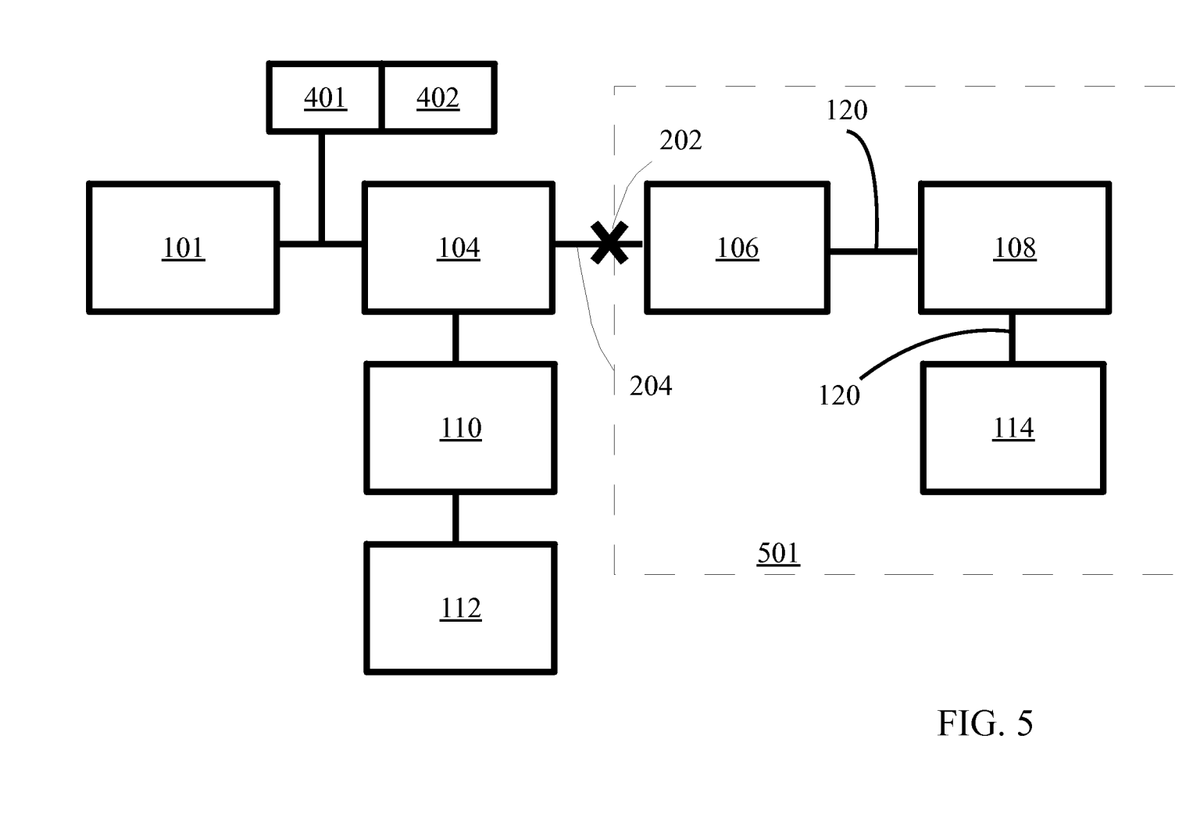
FIG. 5 is an example of a system including a section with non-transmitting devices.

FIG. 5 is an example of a system including a section with non-transmitting devices. Numeral 502 marks the section that includes devices 106, 108, and 114 which are not received by receiver 401. It should be noted devices 106, 108, and 114 can continue to transmit even when they are not received. Communication link 204 between a transmitting device (104) and a non-transmitting device (106) is the link in which a fault exists. In an example the link contains a connector this can provide sufficient information to locate the fault attributed to a connector. In another example, the link can be visually inspected for signs of corrosion or tear.

Assessment of the distance of the fault from the transmitting device could be (Block 324) done by comparing the received signal width with the transmitted signal width. The signal width means the elapsed time from a threshold crossing of the rising part of the signal, to a threshold crossing of the falling part of the signal. FIG. 6 is an example of a received signal received by receiver. Signal 620 in FIG. 6 is composed of two underlying signals, the transmitted signal 604, which travelled towards the receiver, and the reflected signal 608 which travelled towards the fault and was then reflected towards the receiver. The signal reflected by the communication bus, non-impedance matched section, is an attenuated, time delayed replica (604) of the transmitted pulse (602). The resulting signal (606) width (608), is the width of the original signal (620) expanded by the time delay, (610), of the signal as it transverse the communication link from the transmitter to the fault and back. In most practical systems, the signal will have a non-negligible rise and fall time. FIG. 6 is an example where the time required for the signal to rise (614), also called signal rise time, and the time required for the signal to return to its nominal value (612), also called signal fall time, obscures the signal width expansion due to the reflected signal. Accordingly, the minimal distance at which faults could be identified is determined by the signal rise time and fall time.

If the Fault is close to the transmitter of this pulse, the signal reflected from the fault reaches the receiver in a short time. For fault distance detection it is required this time is longer than pulse rise time. For example, a fault at a distance of 1 meter would return echo within 11 ns. If the rising edge, 614, is longer than 11 ns, the combined 606 signal will have a faster rising edge after 11 ns. It will then pass the threshold, 705 at a shorter time. The timer will start counting earlier and the resulting pulse width will be longer corresponding to a fault farther away. A faster pulse rise time reduces this problem.

In most cases, the signal rise and fall time is determined by the bus signal propagation characteristics. Reducing the rise and fall time is advantageous to enhance the accuracy of measurement, however reducing the rise and fall time can create a ringing phenomenon which can then cause an error in the measurement. To summarize, the receiver is further configured to receive the transmitted signal as well as any reflected signals arising from non-impedance matched section in communication bus and wherein a time difference between transmitted pulse width and received pulse width indicates a distance between the non-impedance matched section and the transmitter on the communication bus.

Figure 7:
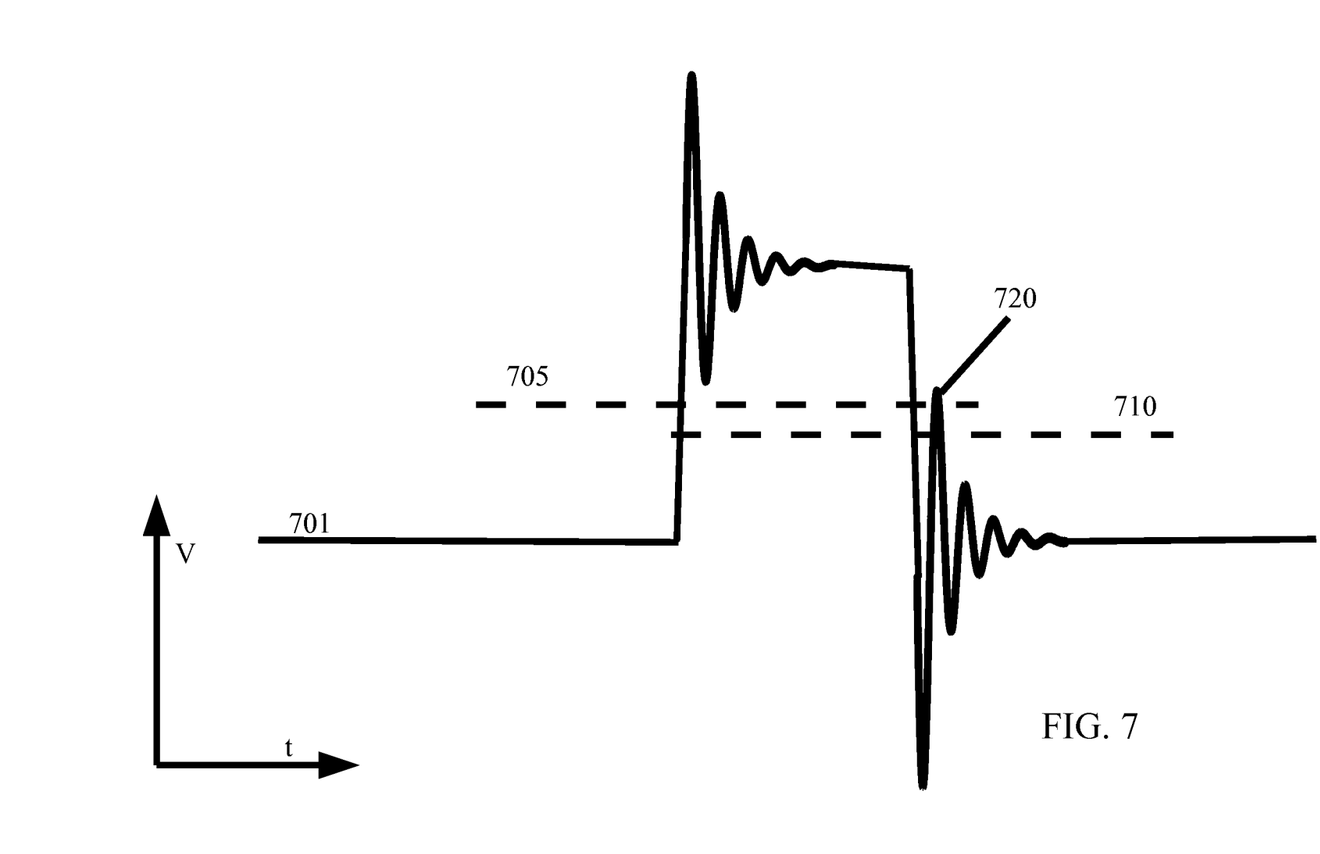
FIG. 7 is an example of a ringing phenomenon that could be caused by use of short pulse.

FIG. 7 is an example of a ringing phenomenon that could be caused by use of short pulse. Attempts to reduce the rise or fall time of the signal usually result in a ringing of the signal at the transition points. FIG. 7 shows that the pulse start is determined by a crossing of signal level 705. Level 705 can be set for example at 20, 50 70% or other signal value up to the maximum signal level of the bus. The specific value is often determined by the communication bus specification or standard. The pulse end is determined by a crossing of signal level 710. Similarly for signal level marked 705, the level height of 705 could be set for example at 20, 50 70% or other number up to the maximum signal level. The specific value is typically determined by the relevant communication bus specification or existing standard. FIG. 7 is an example of a short pulse use that results in a wrong pulse width reading due to the ringing phenomena. In FIG. 7 the pulse threshold criteria is subject to crossing by the signal ringing, which results in an erroneous pulse width reading to overcome this problem, a modified transceiver could be used to provide an asymmetric signal where the rise and fall time of the signal is different.

Figure 8:
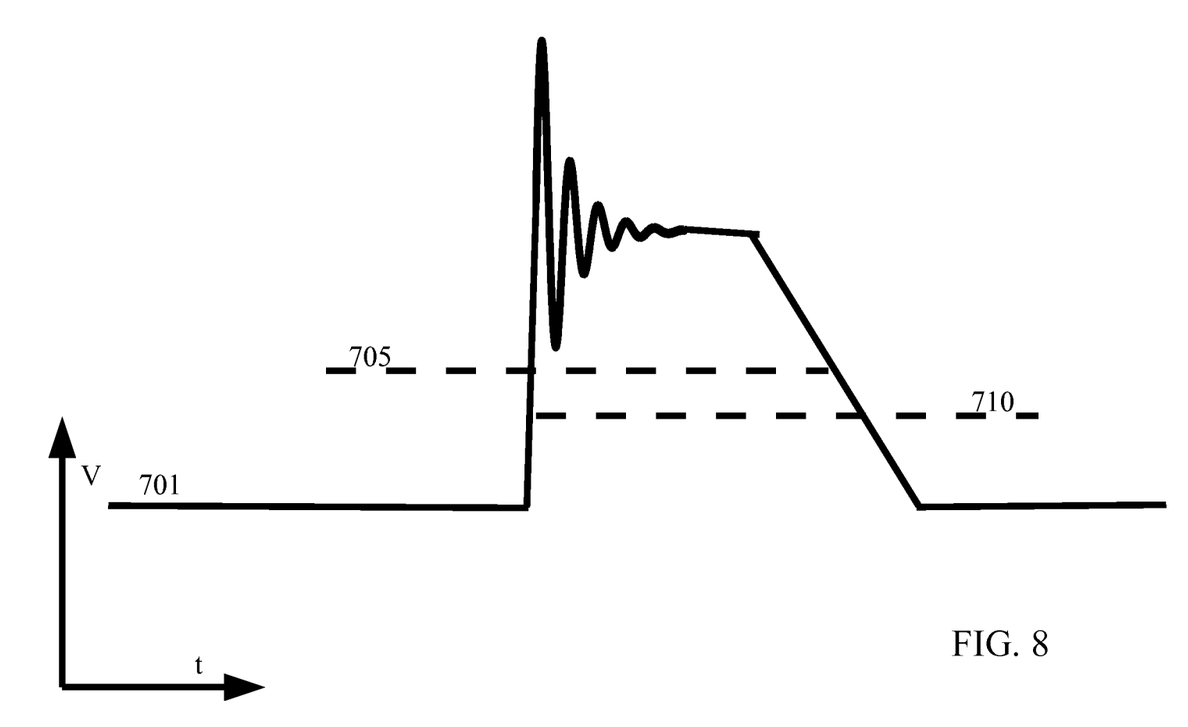
FIG. 8 is an example of pulse width measurement using signal level crossing and adverse effect of ringing.

FIG. 8 is an example of pulse width measurement using signal level crossing and adverse effect of ringing. The pulse features an asymmetric rise and fall time. The front or leading edge of the pulse may have a ringing effect to it. However the front edge ringing does not affect the rising signal threshold 705, while the tail of the signal has no ringing that could result in a non-ambiguous crossing of level 710.

Figure 9:
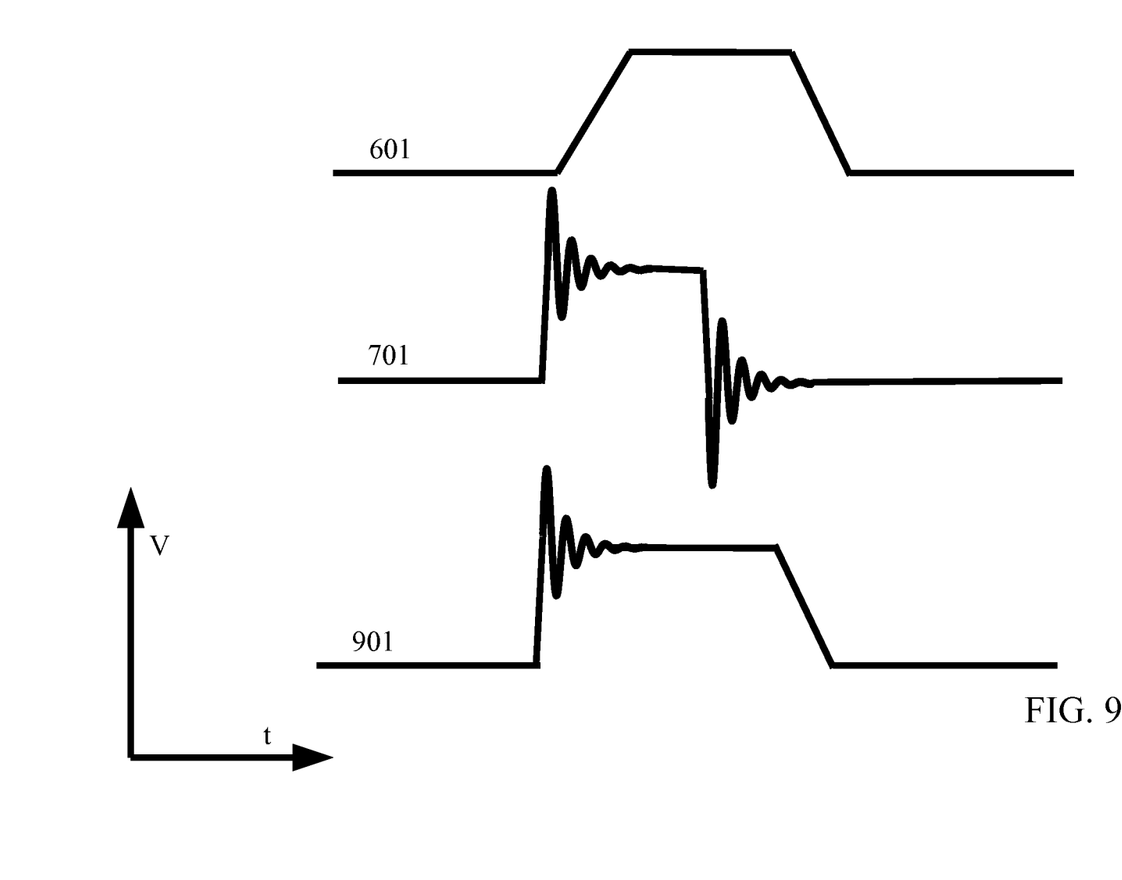
FIG. 9 is an example of a pulse resulting from a sum of a pulse with short rise and fall time and a pulse with long rise and fall time.

The asymmetric signal can be generated using a variety of techniques including digital signal processors, microcontrollers and other means for creating digital signals. FIG. 9. Is an example of producing the asymmetric pulse shape using a combination of two transmitters. One transmitter has a short pulse rise and fall time with ringing at the transition level (701), while the other transmitter has long rise and fall time with no ringing at level (601). The sum of the two pulses results in the desired pulse shape (901). The resulting pulse features fast rise time and the long pulse fall time does not cause ringing at the end of the pulse. An example of devices that could be used to create such a pulse are the RS485 10 MHz transceiver commercially available from a variety of suppliers providing the fast rise time, and standard CAN bus transceiver featuring the longer fall time. In this example the final signal will have a rise time of 10 ns and fall time of 40 ns. Additional examples include a micro controller or programmable devices which can modulate the desired voltage on the communication bus.

What is claimed is:

1. A system for control of integrity of a communication bus said system comprising:
   communication bus;
   at least one transmitter configured to generate and transmit a signal on the communication bus; and
   at least one receiver configured to receive a signal generated by the transmitter and transmitted on the communication bus; and
   a database of all transmitters on said communication bus, wherein the database contains, transmitter relative location, transmitter signal information and signal rate,
   wherein the system is constructed and arranged to identify a fault when the transmitter measured signal rate is different than the transmitter signal rate in the database; and wherein once a missing transmitter is identified, this indicates a fault and when a fault is identified, the database is queried to identify the nearest functional transmitter to the missing transmitter; activating a signal from said functional transmitter; measuring in the receiver a received signal pulse width; and ascertaining from said received signal pulse width a distance of the fault from the nearest functional transmitter.

2. The system according to claim 1, wherein the communication bus is at least one of a group of buses consisting of CAN busMil-Std-1553, CAN, FlexRay.

3. The system according to claim 1, wherein the signal reflected by the communication bus non-impedance matched section is an attenuated, time delayed replica of the transmitted pulse.

4. The system according to claim 1 where the non-impedance matched sections of the communication bus are either an open termination or short circuit termination, or connection to a local or global ground terminal.

5. The system according to claim 1, where the transmitted signal is obtained from a combination of two transmitters wherein each transmitter generates a signal with different signal rise and fall times.

* * * * *